US010312516B2

United States Patent
Akira et al.

(10) Patent No.: US 10,312,516 B2
(45) Date of Patent: Jun. 4, 2019

(54) NEGATIVE-ELECTRODE ACTIVE MATERIAL FOR NON-AQUEOUS ELECTROLYTE SECONDARY BATTERY, AND NON-AQUEOUS ELECTROLYTE SECONDARY BATTERY

(71) Applicant: Sanyo Electric Co., Ltd., Daito-shi, Osaka (JP)

(72) Inventors: Tatsuya Akira, Osaka (JP); Hiroshi Minami, Hyogo (JP); Taizou Sunano, Tokushima (JP)

(73) Assignee: SANYO Electric Co., Ltd., Daito-shi (JP)

( * ) Notice: Subject to any disclaimer, the term of this patent is extended or adjusted under 35 U.S.C. 154(b) by 0 days.

(21) Appl. No.: 15/524,395

(22) PCT Filed: Jan. 18, 2016

(86) PCT No.: PCT/JP2016/000216
§ 371 (c)(1),
(2) Date: Nov. 15, 2018

(87) PCT Pub. No.: WO2016/121320
PCT Pub. Date: Aug. 4, 2016

(65) Prior Publication Data
US 2018/0287148 A1 Oct. 4, 2018

(30) Foreign Application Priority Data
Jan. 28, 2015 (JP) .................................. 2015-014227

(51) Int. Cl.
*H01M 4/58* (2010.01)
*H01M 4/36* (2006.01)
(Continued)

(52) U.S. Cl.
CPC ......... *H01M 4/5825* (2013.01); *C01B 33/113* (2013.01); *H01M 4/134* (2013.01);
(Continued)

(58) Field of Classification Search
None
See application file for complete search history.

(56) References Cited

U.S. PATENT DOCUMENTS

2003/0053945 A1 3/2003 Fukuoka et al.
2014/0231721 A1* 8/2014 Kojima .................. C01B 33/32
252/506

(Continued)

FOREIGN PATENT DOCUMENTS

JP 2003-160328 A 6/2003
JP 2007-59213 A 3/2007
(Continued)

OTHER PUBLICATIONS

International Search Report dated Apr. 19, 2016, issued in counterpart application No. PCT/JP2016/000216. (2 pages).

*Primary Examiner* — Scott J. Chmielecki
(74) *Attorney, Agent, or Firm* — Westerman, Hattori, Daniels & Adrian, LLP

(57) ABSTRACT

A negative-electrode active material for a non-aqueous electrolyte secondary battery containing a silicon material, wherein the negative-electrode active material can constitute a non-aqueous electrolyte secondary battery having high charge capacity, high initial charge/discharge efficiency, and good cycle characteristics. A negative-electrode active material particle according to an embodiment includes a lithium silicate phase represented by $Li_{2z}SiO_{(2+z)}$ {$0<z<2$} and particles dispersed in the lithium silicate phase. Each of the particles includes a silicon core particle and a surface layer formed of an iron alloy containing Si (FeSi alloy). In an XRD pattern of the negative-electrode active material par- (Continued)

ticle obtained by XRD measurement, a diffraction peak of the FeSi alloy at 2θ=approximately 45 degrees has a half-width of 0.40 degrees or more, and a diffraction peak of a Si (111) plane at 2θ=approximately 28 degrees has a half-width of 0.40 degrees or more.

13 Claims, 2 Drawing Sheets

(51) Int. Cl.
*H01M 4/38* (2006.01)
*C01B 33/113* (2006.01)
*H01M 4/134* (2010.01)
*H01M 10/0525* (2010.01)
*H01M 4/02* (2006.01)

(52) U.S. Cl.
CPC ............... *H01M 4/36* (2013.01); *H01M 4/38* (2013.01); *H01M 4/58* (2013.01); *H01M 10/0525* (2013.01); *H01M 2004/021* (2013.01); *H01M 2004/027* (2013.01)

(56) References Cited

U.S. PATENT DOCUMENTS

| | | | |
|---|---|---|---|
| 2015/0037681 A1 | 2/2015 | Morita et al. | |
| 2015/0188127 A1 | 7/2015 | Niimi et al. | |
| 2015/0221950 A1* | 8/2015 | Minami | H01M 4/134 |
| | | | 429/223 |
| 2015/0372294 A1 | 12/2015 | Minami et al. | |
| 2016/0190553 A1* | 6/2016 | Minami | H01M 4/364 |
| | | | 429/221 |
| 2016/0254525 A1* | 9/2016 | Hirose | H01M 4/131 |
| | | | 429/231.1 |
| 2016/0344019 A1* | 11/2016 | Hirose | H01M 4/366 |
| 2017/0214041 A1* | 7/2017 | Minami | H01M 4/364 |
| 2017/0338470 A1* | 11/2017 | Inoue | H01M 4/1395 |
| 2018/0090750 A1* | 3/2018 | Oh | H01M 4/1395 |

FOREIGN PATENT DOCUMENTS

| | | |
|---|---|---|
| JP | 2011-233245 A | 11/2011 |
| JP | 2013-161705 A | 8/2013 |
| JP | 2014-44899 A | 3/2014 |
| WO | 2013/145108 A1 | 10/2013 |
| WO | 2014/119256 A1 | 8/2014 |

* cited by examiner

NEGATIVE-ELECTRODE ACTIVE MATERIAL FOR NON-AQUEOUS ELECTROLYTE SECONDARY BATTERY, AND NON-AQUEOUS ELECTROLYTE SECONDARY BATTERY

TECHNICAL FIELD

The present disclosure relates to a negative-electrode active material for a non-aqueous electrolyte secondary battery and a non-aqueous electrolyte secondary battery.

BACKGROUND ART

It is known that more lithium ions per unit volume can be intercalated into silicon materials, such as silicon (Si) and silicon oxides represented by $SiO_x$, than into carbon materials, such as graphite. In particular, the volume change due to the intercalation of lithium ions is smaller in $SiO_x$ than in Si, and application of $SiO_x$ to a negative electrode of lithium-ion batteries has been investigated. For example, Patent Literature 1 discloses a non-aqueous electrolyte secondary battery that contains a mixture of $SiO_x$ and graphite as a negative-electrode active material.

However, non-aqueous electrolyte secondary batteries that contain $SiO_x$ as a negative-electrode active material have lower initial charge/discharge efficiency than non-aqueous electrolyte secondary batteries that contain graphite as a negative-electrode active material. This is mainly because $SiO_x$ is converted into $Li_4SiO_4$ (an irreversible reactant) in an irreversible reaction during charging and discharging. Thus, in order to suppress such an irreversible reaction and improve initial charge/discharge efficiency, a negative-electrode active material represented by $SiLi_xO_y$ (0<x<1.0, 0<y<1.5) is proposed (see Patent Literature 2).

Patent Literature 3 discloses a negative-electrode active material containing a lithium silicate phase composed mainly of $Li_4SiO_4$ in silicon oxide.

CITATION LIST

Patent Literature

PTL 1: Japanese Published Unexamined Patent Application No. 2011-233245
PTL 2: Japanese Published Unexamined Patent Application No. 2003-160328
PTL 3: Japanese Published Unexamined Patent Application No. 2007-59213

SUMMARY OF INVENTION

Technical Problem

The techniques disclosed in Patent Literature 2 and Patent Literature 3 are aimed at improving the initial charge/discharge efficiency by heat-treating a mixture of $SiO_x$ and a lithium compound at high temperature to convert $SiO_2$ into an irreversible reactant $Li_4SiO_4$ in advance. In these processes, however, $SiO_2$ remains within a particle, and $Li_4SiO_4$ is formed only on the particle surface. A reaction within the particle requires another high-temperature process. However, high-temperature heat-treatment promotes the crystal growth of Si and $Li_4SiO_4$, localizes the distribution of Si and $Li_4SiO_4$, and reduces dispersibility in the particle. Furthermore, increased crystallinity of Si results in an increased volume change of Si and increased expansion of the active material particle. Increased crystallinity of $Li_4SiO_4$ results in lower lithium ion conductivity. This reduces charge capacity. Poor dispersibility of Si and $Li_4SiO_4$ lowers the homogeneity of the reaction in the particle and induces particle disintegration during charging and discharging.

Non-aqueous electrolyte secondary batteries are required not only to have high charge capacity and initial charge/discharge efficiency but also to suffer a smaller decrease in capacity due to the charge/discharge cycle. It is an object of the present disclosure to provide a negative-electrode active material for a non-aqueous electrolyte secondary battery containing a silicon material, wherein the negative-electrode active material can constitute a non-aqueous electrolyte secondary battery having high charge capacity, high initial charge/discharge efficiency, and good cycle characteristics.

Solution to Problem

A negative-electrode active material for a non-aqueous electrolyte secondary battery according to one aspect of the present disclosure includes a lithium silicate phase represented by $Li_{2z}SiO_{(2+z)}$ {0<z<2} and particles dispersed in the lithium silicate phase, the particles containing a silicon (Si) core particle and a surface layer formed of an iron alloy containing Si (FeSi alloy), wherein in an XRD pattern obtained by XRD measurement, a diffraction peak of the FeSi alloy at 2θ=approximately 45 degrees has a half-width of 0.40 degrees or more, and a diffraction peak of a Si (111) plane at 2θ=approximately 28 degrees has a half-width of 0.40 degrees or more.

Advantageous Effects of Invention

A negative-electrode active material for a non-aqueous electrolyte secondary battery according to one aspect of the present disclosure can constitute a non-aqueous electrolyte secondary battery having high charge capacity and initial charge/discharge efficiency and good cycle characteristics.

DESCRIPTION OF EMBODIMENTS

Figure 1:
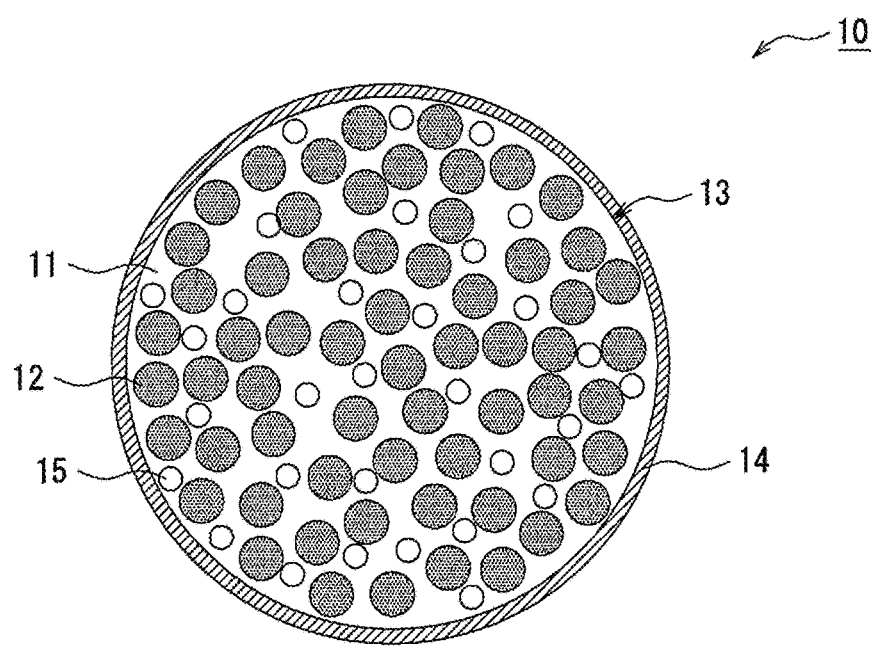
FIG. 1 is a schematic cross-sectional view of a negative-electrode active material according to an embodiment.

Embodiments of the present invention will be described in detail below.

The drawings referred to in the embodiments are schematically illustrated, and the dimensions of constituents in the drawings may be different from the actual dimensions of the constituents. Specific dimensions should be determined in consideration of the following description.

A negative-electrode active material according to one embodiment of the present disclosure includes a lithium silicate phase represented by $Li_{2z}SiO_{(2+z)}$ (0<z<2) and particles composed mainly of Si dispersed in the lithium silicate phase. Each of the particles includes a Si core particle and a surface layer formed of an FeSi alloy. A negative-electrode active material according to one embodiment of the present disclosure may contain $SiO_2$ mostly in the form of a natural oxidation film on the surface of the Si core particle. $SiO_2$ in the form of a natural oxidation film is very different in characteristics from $SiO_2$ contained in known $SiO_x$ particles.

For example, no diffraction peak of $SiO_2$ is observed at $2\theta=25$ degrees in an XRD pattern obtained by XRD measurement of a negative-electrode active material according to one embodiment of the present disclosure. This is probably because the natural oxidation film is very thin and cannot diffract X-rays. By contrast, a diffraction peak of $SiO_2$ is observed at $2\theta=25$ degrees in an XRD pattern of known $SiO_x$ particles.

In known $SiO_x$, fine Si particles are dispersed in a $SiO_2$ matrix, and the following reaction occurs during charging and discharging.

$$SiO_x(2Si+2SiO_2)+16Li^++16e^- \rightarrow 3Li_4Si+Li_4SiO_4 \quad (1)$$

The formula 1 is transformed into the following formulae in terms of Si and $2SiO_2$.

$$Si+4Li^++4e^- \rightarrow Li_4Si \quad (2)$$

$$2SiO_2+8Li^++8e^- \rightarrow Li_4Si+Li_4SiO_4 \quad (3)$$

As described above, the formula 3 is an irreversible reaction, and the formation of $Li_4SiO_4$ is primarily responsible for low initial charge/discharge efficiency.

A negative-electrode active material according to one embodiment of the present disclosure contains particles composed mainly of Si finely and uniformly dispersed in a lithium silicate phase represented by $Li_{2z}SiO_{(2+z)}$ ($0<z<2$) and has a much lower $SiO_2$ content than known $SiO_x$, for example. $SiO_2$ in the negative-electrode active material is a natural oxidation film and is very different in characteristics from $SiO_2$ contained in known $SiO_x$ particles. Thus, in a non-aqueous electrolyte secondary battery containing the negative-electrode active material, the reaction represented by the formula 3 is less likely to occur, and the initial charge/discharge efficiency is improved.

As described above, particles composed mainly of Si and a lithium silicate finely and uniformly dispersed in an active material particle can improve initial charge/discharge efficiency and charge capacity, reduce the volume change associated with charging and discharging, and thereby suppress particle disintegration. In the synthesis of a negative-electrode active material from Si particles and a lithium silicate, however, it was found that heat treatment for enhancing the binding between the Si particles and the lithium silicate causes a reaction between Si and the lithium silicate, reduces Si that contributes to charging and discharging, and thereby reduces capacity. Lower crystallinity of Si generally tends to result in better cycle characteristics, and it was found that the heat treatment increases the crystallinity of Si and causes deterioration of cycle characteristics. It should be noted that the crystallinity of Si is higher in the heat-treatment of a mixture of Si particles and a lithium silicate than in the heat-treatment of Si particles alone even under the same heat-treatment conditions. Thus, the lithium silicate promotes crystallization of Si.

The present inventors have extensively studied to suppress the decrease in capacity and deterioration of cycle characteristics and have found that an FeSi alloy layer on the surface of Si particles can reduce the effects of a lithium silicate during heat treatment. Thus, the present inventors have successfully suppressed a reaction between Si and a lithium silicate and the crystallization of Si in heat treatment. To this end, in an XRD pattern of the negative-electrode active material, a diffraction peak of the FeSi alloy at $2\theta$=approximately 45 degrees must have a half-width of 0.40 degrees or more, and a diffraction peak of a Si (111) plane at $2\theta$=approximately 28 degrees must have a half-width of 0.40 degrees or more. A negative-electrode active material according to one embodiment of the present disclosure can constitute a non-aqueous electrolyte secondary battery having high charge capacity and initial charge/discharge efficiency and good cycle characteristics.

A non-aqueous electrolyte secondary battery according to an embodiment includes a negative electrode containing the negative-electrode active material, a positive electrode, and a non-aqueous electrolyte containing a non-aqueous solvent. Preferably, a separator is disposed between the positive electrode and the negative electrode. A non-aqueous electrolyte secondary battery according to an embodiment includes an electrode assembly and a non-aqueous electrolyte in a housing. The electrode assembly includes a roll of a positive electrode and a negative electrode with a separator interposed therebetween. Alternatively, another electrode assembly, such as a layered electrode assembly, may be used instead of the wound electrode assembly. The layered electrode assembly includes a positive electrode and a negative electrode stacked with a separator interposed therebetween. The non-aqueous electrolyte secondary battery may be of any type, for example, of a cylindrical, square or rectangular, coin, button, or laminate type.

[Positive Electrode]

Preferably, the positive electrode includes a positive-electrode current collector, for example, formed of metal foil, and a positive-electrode mixture layer disposed on the current collector. The positive-electrode current collector can be formed of foil of a metal stable in the electric potential range of the positive electrode, such as aluminum, or a film having a surface layer formed of the metal. The positive-electrode mixture layer preferably contains an electrically conductive agent and a binder as well as a positive-electrode active material. The particles of the positive-electrode active material may be covered with fine particles of an oxide, such as aluminum oxide ($Al_2O_3$), or of an inorganic compound, such as a phosphoric acid compound or a boric acid compound.

The positive-electrode active material may be a lithium transition metal oxide containing at least one transition metal element, such as Co, Mn, and/or Ni. For example, the lithium transition metal oxide may be $Li_xCoO_2$, $Li_xNiO_2$, $Li_xMnO_2$, $Li_xCo_yNi_{1-y}O_2$, $Li_xCo_yM_{1-y}O_z$, $Li_xNi_{1-y}M_yO_z$, $Li_xMn_2O_4$, $Li_xMn_{2-y}M_yO_4$, $LiMPO_4$, or $Li_2MPO_4F$ (M: at least one of Na, Mg, Sc, Y, Mn, Fe, Co, Ni, Cu, Zn, Al, Cr, Pb, Sb, and B, $0<x\leq1.2$, $0<y\leq0.9$, $2.0\leq z\leq2.3$). These may be used alone or in combination.

The electrically conductive agent is used to increase the electrical conductivity of the positive-electrode mixture layer. The electrically conductive agent may be a carbon material, such as carbon black, acetylene black, ketjen black, or graphite. These may be used alone or in combination.

The binder is used to maintain good contact between the positive-electrode active material and the electrically conductive agent and improve the binding property of the positive-electrode active material on the surface of the positive-electrode current collector. The binder may be a fluoropolymer, such as polytetrafluoroethylene (PTFE) or poly(vinylidene fluoride) (PVdF), polyacrylonitrile (PAN), polyimide resin, acrylic resin, or polyolefin resin. These resins may be used in combination with carboxymethylcellulose (CMC) or a salt thereof (such as CMC-Na, CMC-K, or CMC-NH$_4$, or a partially neutralized salt thereof) or poly(ethylene oxide) (PEO). These may be used alone or in combination.

[Negative Electrode]

Preferably, the negative electrode includes a negative-electrode current collector, for example, formed of metal foil, and a negative-electrode mixture layer disposed on the current collector. The negative-electrode current collector can be formed of foil of a metal stable in the electric potential range of the negative electrode, such as copper, or a film having a surface layer formed of the metal. The negative-electrode mixture layer preferably contains a binder as well as a negative-electrode active material. As in the positive electrode, the binder can be a fluoropolymer, PAN, polyimide resin, acrylic resin, or polyolefin resin. In the preparation of a mixture slurry with an aqueous solvent, preferably used is CMC or a salt thereof (such as CMC-Na, CMC-K, or CMC-$NH_4$, or a partially neutralized salt thereof), styrene-butadiene rubber (SBR), poly(acrylic acid) (PAA) or a salt thereof (such as PAA-Na or PAA-K, or a partially neutralized salt thereof), or poly(vinyl alcohol) (PVA).

FIG. 1 is a cross-sectional view of a negative-electrode active material particle 10 according to an embodiment.

As illustrated in FIG. 1, the negative-electrode active material particle 10 includes a lithium silicate phase 11 and particles 12 dispersed in the phase. Each of the particles 12 includes an FeSi alloy surface layer 16 covering a Si core particle 15. $SiO_2$ in the negative-electrode active material particle 10 is mostly in the form of a natural oxidation film. Preferably, no diffraction peak of $SiO_2$ is observed at $2\theta=25$ degrees in an XRD pattern obtained by XRD measurement of the negative-electrode active material particle 10. The lithium silicate phase 11 and the particles 12 constitute a base particle 13, which is preferably covered with an electrically conductive layer 14.

The base particle 13 may contain a third component in addition to the lithium silicate phase 11 and the particles 12. The amount of $SiO_2$, if any, in the form of a natural oxidation film contained in the base particle 13 is preferably less than 10% by mass, more preferably less than 7% by mass. A smaller size of the particles 12 results in a larger surface area of the particles 12 and more $SiO_2$ in the form of a natural oxidation film.

The particles 12 are composed mainly of Si, as described above. More lithium ions can be intercalated into Si than into carbon materials, such as graphite. Thus, use of the negative-electrode active material particles 10 each containing the particles 12 in the negative-electrode active material contributes to increased capacity of the battery. The negative-electrode mixture layer may contain the negative-electrode active material particles 10 alone as a negative-electrode active material. However, since the volume change due to charging and discharging is greater in the silicon material than in graphite, another active material that suffers a smaller volume change due to charging and discharging may also be used to increase capacity while maintaining good cycle characteristics. The other active material is preferably a carbon material, such as graphite.

The graphite may be graphite conventionally used as a negative-electrode active material, for example, natural graphite, such as flake graphite, bulk graphite, or earthy graphite, or artificial graphite, such as massive artificial graphite (MAG) or graphitized mesophase carbon microbeads (MCMB). If graphite is used in combination, the mass ratio of the negative-electrode active material particles 10 to graphite preferably ranges from 1:99 to 30:70. At a mass ratio of the negative-electrode active material particles 10 to graphite within this range, both higher capacity and improved cycle characteristics can be more easily achieved. When the ratio of the negative-electrode active material particles 10 to graphite is less than 1% by mass, this reduces the advantages of the addition of the negative-electrode active material particles 10 to increase capacity.

The lithium silicate phase 11 is formed of a lithium silicate represented by $Li_{2z}SiO_{(2+z)}$ ($0<z<2$). In other words, $Li_4SiO_4$ ($Z=2$) does not constitute the lithium silicate phase 11. $Li_4SiO_4$ is an unstable compound, reacts with water and becomes alkaline, and thereby modifies Si and reduces charge/discharge capacity. From the perspective of stability, manufacturability, and lithium ion conductivity, the lithium silicate phase 11 is composed of at least one of $Li_2SiO_3$ ($Z=½$) and $Li_2Si_2O_5$ ($Z=1$) and is preferably composed mainly of $Li_2SiO_3$ or $Li_2Si_2O_5$. When $Li_2SiO_3$ or $Li_2Si_2O_5$ is a main component (a component with the largest mass), the main component content is preferably more than 50% by mass, more preferably 80% or more by mass, of the total mass of the lithium silicate phase 11.

For example, the lithium silicate phase 11 is composed of fine particles, preferably particles finer than the particles 12. In an XRD pattern of the negative-electrode active material particle 10, for example, the diffraction peak intensity of the Si (111) plane is higher than the diffraction peak intensity of the (111) plane of a lithium silicate.

The negative-electrode active material particles 10 after charging and discharging preferably contain no $Li_4SiO_4$. Since $SiO_2$ in the starting material of the negative-electrode active material particles 10 is mostly in the form of a natural oxidation film, the reaction represented by the formula (3) is less likely to occur in initial charging and discharging, and the irreversible reactant $Li_4SiO_4$ is negligibly formed.

Preferably, the particles 12 are almost uniformly dispersed in the lithium silicate phase 11. For example, the negative-electrode active material particle 10 (the base particle 13) has a sea-island structure in which fine particles 12 are dispersed in a lithium silicate matrix, and the particles 12 are not localized in a particular region and are almost uniformly distributed in any cross section of the negative-electrode active material particle 10 (the base particle 13). From the perspective of higher capacity and improved cycle characteristics, the amount of the particles 12 may range from 20% to 75% by mass, preferably 35% to 50% by mass, of the total mass of the base particle 13. An excessively small amount of the particles 12 results in a decreased amount of Si contained in the particles 12 and may result in decreased charge/discharge capacity and poor load characteristics due to insufficient diffusion of lithium ions. On the other hand, an excessively large amount of the particles 12 may result in insufficient coverage of the particles 12 with a lithium silicate and consequently contact between part of the particles 12 and an electrolyte solution, thus causing deterioration of cycle characteristics.

As described above, the particles 12 are core-shell particles each composed of a Si core and an FeSi alloy shell. The FeSi alloy surface layer 16 suppresses a reaction between Si and a lithium silicate during heat treatment and suppresses the crystallization of Si. The Fe content of the particles 12 may be 15% or less by mass, preferably 0.03% to 12% by mass, of the total mass of the particles 12. In other words, the Si content may be 85% or more by mass, preferably 87% to 99.97% by mass, of the total mass of the particles 12. An excessively high Fe content may result in decreased charge/discharge capacity and poor load characteristics due to insufficient diffusion of lithium ions. An excessively low Fe content may result in smaller effects of reducing the influence of a lithium silicate during heat treatment.

The core particle 15 may have an average particle size of 500 nm or less, preferably 200 nm or less, more preferably 50 nm or less, before initial charging. After charging and discharging, 400 nm or less is preferred, and 100 nm or less is more preferred. A decrease in the size of the core particle 15 results in a smaller volume change during charging and discharging and makes it easier to suppress the disintegration of the electrode structure. The average particle size of the core particle 15 is determined by observing a cross section of the negative-electrode active material particle 10 with a scanning electron microscope (SEM) or a transmission electron microscope (TEM) More specifically, the average particle size of the core particles 15 is determined by averaging the longest diameters of 100 of the core particles 15.

The thickness of the surface layer 16 preferably ranges from 3 to 50 nm, more preferably 5 to 40 nm, in consideration of a reduction of the influence of a lithium silicate and the diffusion of lithium ions into the core particle 15 during heat treatment. The thickness of the surface layer 16 can be determined by the cross-sectional observation of particles with SEM or TEM. The surface layer 16 is formed by depositing Fe particles on the surface of a Si particle and heat-treating the Fe particles at high temperature, as described in detail later. Thus, a SEM observation of the surface layer 16 shows grain boundaries of the Fe particles. The surface layer 16 may partly or almost entirely cover the core particle 15.

Fe of the surface layer 16 forms an alloy with Si of the core particle 15. Thus, an XRD pattern of the negative-electrode active material particle 10 includes a diffraction peak of an FeSi alloy. The negative-electrode active material particle 10 may contain Fe particles that are not deposited on the core particles 15 and do not form an alloy with Si. The Fe content may be 7% or less by mass, preferably 5% or less by mass, more preferably 0.02% to 5% by mass, particularly preferably 0.5% to 3% by mass, of the total mass of the base particle 13. An excessively high Fe content results in low capacity per weight. On the other hand, an excessively low Fe content results in a decreased amount of FeSi alloy formed on the core particle 15 and smaller effects of reducing the influence of a lithium silicate during heat treatment. The amount of Fe particles that are not deposited on the core particle 15 and are dispersed in the lithium silicate phase 11 is preferably 30% or less by mass, more preferably 15% or less by mass, of all Fe contained in the base particle 13.

The average particle size of the particles constituting the surface layer 16, that is, the FeSi alloy particles deposited on the core particle 15 is smaller than the average particle size of the core particle 15 and is 100 nm or less, for example. In order to protect the core particle 15 and form the surface layer 16 that does not block the diffusion of lithium ions in the particle, the particles preferably have an average particle size in the range of 10 to 30 nm. The average particle size can be measured in the same manner as in the core particle 15.

In an XRD pattern of the negative-electrode active material particle 10 (the base particle 13) obtained by XRD measurement, a diffraction peak of the FeSi alloy at 2θ=approximately 45 degrees has a half-width of 0.40 degrees or more, and a diffraction peak of a Si (111) plane at 2θ=approximately 28 degrees has a half-width of 0.40 degrees or more. When the FeSi alloy has a half-width of 0.40 degrees or more, a reaction between Si and a lithium silicate and the crystallization of Si during heat treatment can be suppressed. When the Si has a half-width of more than 0.40 degrees, the cycle characteristics are improved. The FeSi alloy preferably has a half-width of 0.50 or more, more preferably 0.54 or more. The Si preferably has a half-width of 0.42 or more, more preferably 0.45 or more.

In the negative-electrode active material particle 10 (the base particle 13), a diffraction peak of a (111) plane of a lithium silicate in an XRD pattern obtained by XRD measurement preferably has a half-width of 0.05 degrees or more. When the half-width is adjusted to be 0.05 degrees or more, the lithium silicate phase has lower crystallinity, the interior of the particles has higher lithium ion conductivity, and the volume change of the particles 12 associated with charging and discharging is further reduced. The preferred half-width of a diffraction peak of a (111) plane of a lithium silicate depends partly on the components of the lithium silicate phase 11 and is more preferably 0.09 degrees or more, for example, 0.09 to 0.55 degrees.

When the lithium silicate phase 11 is composed mainly of $Li_2Si_2O_5$, the half-width of the diffraction peak of the (111) plane of $Li_2Si_2O_5$ in an XRD pattern of the negative-electrode active material particle 10 is preferably 0.09 degrees or more. For example, when $Li_2Si_2O_5$ constitutes 80% or more by mass of the total mass of the lithium silicate phase 11, the diffraction peak has a preferred half-width in the range of 0.09 to 0.55 degrees. When the lithium silicate phase 11 is composed mainly of $Li_2SiO_3$, the half-width of the diffraction peak of (111) of $Li_2SiO_3$ in an XRD pattern of the negative-electrode active material particle 10 is preferably 0.10 degrees or more. For example, when $Li_2SiO_3$ constitutes 80% or more by mass of the total mass of the lithium silicate phase 11, the diffraction peak has a preferred half-width in the range of 0.10 to 0.55 degrees.

The half-width of a diffraction peak of an FeSi alloy, Si, and a lithium silicate is determined under the following conditions. In the presence of a plurality of lithium silicates, the half-width (degrees (2θ)) of the peak of the (111) plane of each lithium silicate is determined. When a diffraction peak of a (111) plane of a lithium silicate overlapped the diffraction peak of other Miller indices or the diffraction peak of another substance, the half-width of the diffraction peak of the (111) plane of the lithium silicate is measured after isolated.

Measuring apparatus: X-ray diffractometer (Model: RINT-TTRII) manufactured by Rigaku Corporation Anticathode: Cu Tube voltage: 50 kv Tube current: 300 mA Optical system: parallel beam method

[Incident side: multilayer film mirror (angle of divergence: 0.05 degrees, beam width: 1 mm), Soller slits (5 degrees), Light-receiving side: long slits PSA200 (resolution: 0.057 degrees), Soller slits (5 degrees)]

Scan step: 0.01 or 0.02 degrees

Counting time: 1 to 6 seconds

The negative-electrode active material particles 10 preferably have an average particle size in the range of 1 to 15 μm, more preferably 4 to 10 μm, in terms of higher capacity and improved cycle characteristics. The average particle size of the negative-electrode active material particles 10 is the size of primary particles and refers to the particle size at which the integrated volume is 50% in the particle size distribution measured by a laser diffraction scattering method (for example, with "LA-750" manufactured by Horiba, Ltd.) (the volume-average particle size). When the negative-electrode active material particles 10 have an excessively small average particle size, this tends to result in decreased capacity due to an increased surface area and an enhanced reaction with an electrolyte. On the other hand, when the negative-electrode active material particles 10 have an excessively large average particle size, this tends to result in an increased volume change due to charging and discharging and the deterioration of cycle characteristics. Although the base particle 13 is preferably covered with the electrically conductive layer 14, the electrically conductive layer 14 has a small thickness and has little effect on the average particle size of the negative-electrode active material particle 10 (the particle size of the negative-electrode active material particle 10 is almost equal to the particle size of the base particle 13).

The base particles 13 can be manufactured through the following steps 1 to 3, for example. These steps are performed in an inert atmosphere.

(1) A ground Si powder and a ground Fe powder each having an average particle size in the range of several to tens of micrometers are mixed to prepare a mixture.

(2) The mixture is then ground in a ball mill for micronization. For example, Fe particles having an average particle size of 30 nm or less are deposited on a Si particle having an average particle size of 200 nm or less. Alternatively, their raw powders subjected to micronization in advance may be used to prepare the mixture.

(3) The mixture ground in (2), that is, the Si particles on which the Fe particles are deposited are then mixed with a ground lithium silicate powder having an average particle size in the range of several to tens of micrometers and are further ground in a ball mill.

(4) The mixture ground in (3) is then heat-treated at a temperature in the range of 600° C. to 800° C., for example. In the heat treatment, the mixture may be pressed, for example, by hot pressing to form a sintered body. An FeSi alloy surface layer formed on the Si particle suppresses a reaction between Si and a lithium silicate and the crystallization of Si.

The negative-electrode active material particle 10 preferably includes the electrically conductive layer 14 on its surface. The electrically conductive layer 14 is formed of a material having higher electrical conductivity than the lithium silicate phase 11 surrounding the particles 12. The electrically conductive agent of the electrically conductive layer 14 is preferably electrochemically stable and is preferably at least one selected from the group consisting of carbon materials, metals, and metallic compounds. As in the electrically conductive agent in the positive-electrode mixture layer, the carbon materials may be carbon black, acetylene black, ketjen black, graphite, and a mixture of at least two of these materials. The metals may be copper, nickel, and alloys thereof that are stable in the electric potential range of the negative electrode. The metallic compounds may be copper compounds and nickel compounds (a metal or metallic compound layer can be formed on the base particle 13, for example, by electroless plating). Among these, the carbon materials are particularly preferred.

A method for covering the base particles 13 with carbon may be a CVD method using acetylene and/or methane or a method of mixing coal pitch, petroleum pitch, and/or a phenolic resin with the base particles 13 and heat-treating the mixture. Alternatively, carbon black and/or ketjen black may be adhered to the base particles 13 with a binder to form a carbon covering layer.

The electrically conductive layer 14 preferably almost entirely covers the base particle 13. The electrically conductive layer 14 preferably has a thickness in the range of 1 to 200 nm, more preferably 5 to 100 nm, in terms of electrical conductivity and the diffusion of lithium ions in the base particle 13. The electrically conductive layer 14 having an excessively small thickness has lower electrical conductivity and has difficulty in uniformly covering the base particle 13. On the other hand, the electrically conductive layer 14 having an excessively large thickness tends to prevent the diffusion of lithium ions into the base particle 13 and decrease capacity. The thickness of the electrically conductive layer 14 can be determined by the cross-sectional observation of particles with SEM or TEM.

[Non-Aqueous Electrolyte]

The non-aqueous electrolyte contains a non-aqueous solvent and an electrolyte salt dissolved in the non-aqueous solvent. The non-aqueous electrolyte is not limited to a liquid electrolyte (non-aqueous electrolytic solution) and may be a solid electrolyte containing a gel polymer. The non-aqueous solvent may be an ester, ether, nitrile, such as acetonitrile, amide, such as dimethylformamide, or a mixed solvent of at least two of these solvents. The non-aqueous solvent may contain a halogen substitution product of these solvents, in which at least part of hydrogens of the solvents are substituted with a halogen atom, such as fluorine.

Examples of the ester include cyclic carbonates, such as ethylene carbonate (EC), propylene carbonate (PC), and butylene carbonate, chain carbonates, such as dimethyl carbonate (DMC), methyl ethyl carbonate (EMC), diethyl carbonate (DEC), methyl propyl carbonate, ethyl propyl carbonate, and methyl isopropyl carbonate, cyclic carboxylates, such as γ-butyrolactone (GBL) and γ-valerolactone (GVL), and chain carboxylates, such as methyl acetate, ethyl acetate, propyl acetate, methyl propionate (MP), ethyl propionate, and γ-butyrolactone.

Examples of the ether include cyclic ethers, such as 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methylfuran, 1,8-cineole, and crown ethers, and chain ethers, such as 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, and tetraethylene glycol dimethyl.

The halogen substitution product is preferably a fluorinated cyclic carbonate, such as fluoroethylene carbonate (FEC), a fluorinated chain carbonate, or a fluorinated chain carboxylate, such as fluoropropionic acid methyl (FMP).

The electrolyte salt is preferably a lithium salt. Examples of the lithium salt include $LiBF_4$, $LiClO_4$, $LiPF_6$, $LiAsF_6$, $LiSbF_6$, $LiAlCl_4$, $LiSCN$, $LiCF_3SO_3$, $LiCF_3CO_2$, $Li(P(C_2O_4)F_4)$, $LiPF_{6-x}(C_nF_{2n+1})$ ($1<x<6$, n is 1 or 2), $LiB_{10}Cl_{10}$, LiCl, LiBr, LiI, chloroborane lithium, lower aliphatic carboxylic acid lithium, borates, such as $Li_2B_4O_7$ and $Li(B(C_2O_4)F_2)$, and imide salts, such as $LiN(SO_2CF_3)_2$ and $LiN(C_lF_{2l+1}SO_2)(C_mF_{2m+1}SO_2)$ (l and m are integers of 1 or more). These lithium salts may be used alone or in combination. Among these, $LiPF_6$ is preferred in terms of ionic conductivity and electrochemical stability. The concentration of lithium salt preferably ranges from 0.8 to 1.8 moles per liter of the non-aqueous solvent.

[Separator]

The separator may be an ion-permeable insulating porous sheet. Specific examples of the porous sheet include microporous thin films, woven fabrics, and nonwoven fabrics. The material of the separator is preferably an olefin resin, such as polyethylene or polypropylene, or cellulose. The separator may be a laminate of a cellulose fiber layer and a thermoplastic fiber layer, such as an olefin resin.

EXAMPLES

Although the present disclosure will be further described in the following examples, the present disclosure is not limited to these examples.

Example 1

[Production of Negative-Electrode Active Material]

A Si powder (3N, 10 μm ground product) and a Fe powder (99.9%, 3 to 5 μm ground product, manufactured by Kojundo Chemical Laboratory Co., Ltd.) were mixed at a mass ratio of 40:3 in an inert atmosphere and were charged into a pot (made of SUS, volume: 500 mL) of a planetary ball mill (P-5 manufactured by Fritsch). The pot was charged with 24 balls made of SUS (diameter: 20 mm) and was closed. The mixed powder was ground at 200 rpm for 10 hours. The ground mixed powder was then mixed with a $Li_2SiO_3$ powder (10 μm ground product) at a mass ratio of 43:57 in an inert atmosphere and was ground at 200 rpm for 50 hours. The powder was then removed in an inert atmosphere and was heat-treated at a temperature of 600° C. in an inert atmosphere for 4 hours. The heat-treated powder (hereinafter referred to as base particles) was ground, was passed through a 40-μm mesh sieve, was mixed with coal pitch (MCP250 manufactured by JFE Chemical Corporation), and was heat-treated at a temperature of 800° C. in an inert atmosphere for 5 hours to be covered with carbon, thus forming an electrically conductive layer. The carbon coverage was 5% by mass of the total mass of the active material particles each containing the base particle and the electrically conductive layer. The average particle size was adjusted to be 5 μm with a sieve. Thus, a negative-electrode active material was produced. The Fe content is 3% by mass of the total weight of the base particle.

[Analysis of Negative-Electrode Active Material]

A SEM observation of a cross section of a particle of the negative-electrode active material showed that Si particles had an average particle size of less than 200 nm. It was also shown that Si particles covered with a surface layer were almost uniformly dispersed in a $Li_2SiO_3$ matrix.

Figure 2:
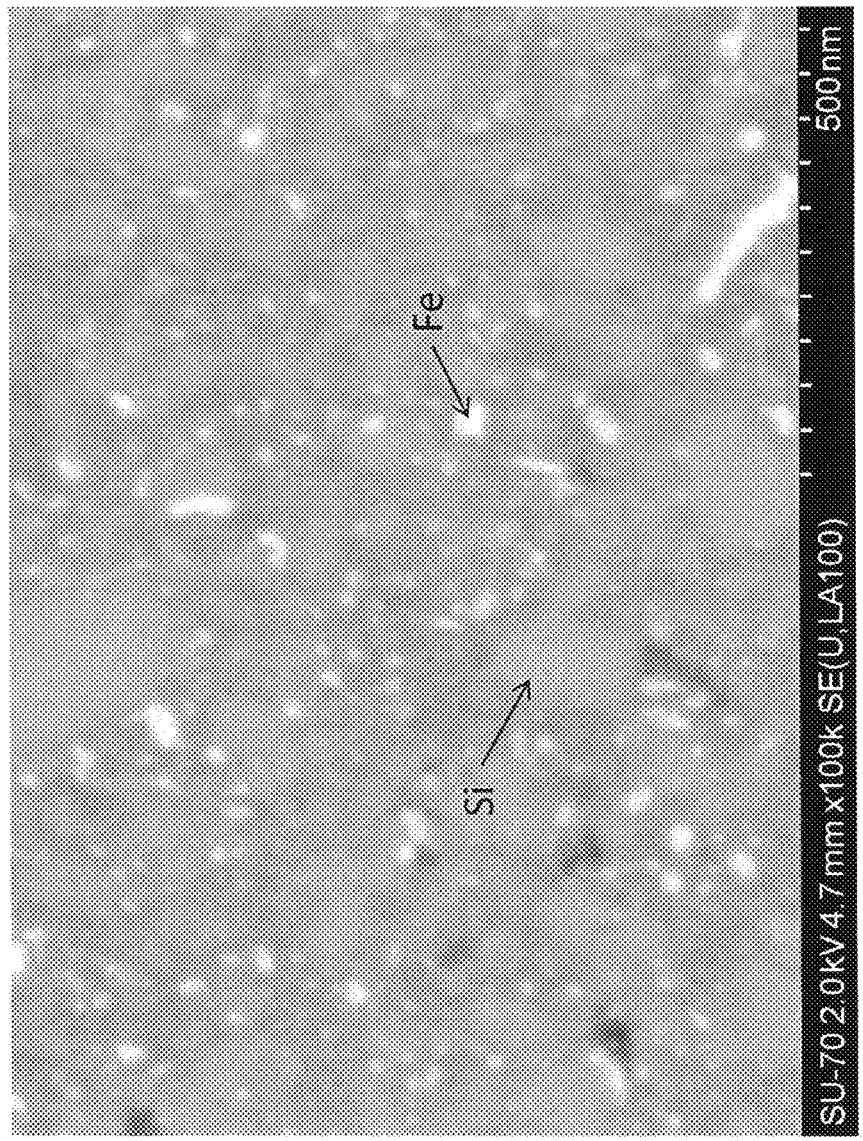
FIG. 2 is an XRD pattern of a cross section of a particle in a negative-electrode active material according to an embodiment.

FIG. 2 shows an XRD pattern of the negative-electrode active material. The XRD pattern of the negative-electrode active material included diffraction peaks mainly attributed to Si, FeSi, and $Li_2SiO_3$. A diffraction peak of the FeSi alloy at 2θ=approximately 45 degrees had a half-width of 0.546 degrees, and a diffraction peak of a Si (111) plane at 2θ=approximately 28 degrees had a half-width of 0.480 degrees. The half-width of Miller indices (111) of $Li_2SiO_3$ at 2θ=approximately 27.0 degrees was 0.233 degrees. No diffraction peak of $SiO_2$ was observed at 2θ=25 degrees. A Si-NMR measurement of a negative-electrode active material A1 showed that the $SiO_2$ content was less than 7% by mass (below the minimum limit of detection). Likewise, the half-widths of the negative-electrode active materials of the examples and the comparative examples described later were determined in the same manner and were listed in Tables 1 and 2.

[Preparation of Negative Electrode]

The negative-electrode active material and polyacrylonitrile (PAN) were then mixed at a mass ratio of 95:5. After N-methyl-2-pyrrolidone (NMP) was added to the mixture, the mixture was stirred in a mixer (Thinky Mixer manufactured by Thinky Corporation) to prepare a negative-electrode mixture slurry. The slurry was then applied to one side of a copper foil such that the mass of the negative-electrode mixture layer was 25 g/m², was dried in air at 105° C., and was rolled. Thus, a negative electrode was prepared. The negative-electrode mixture layer had a density of 1.50 g/cm³.

[Preparation of Non-Aqueous Electrolytic Solution]

Ethylene carbonate (EC) and diethyl carbonate (DEC) were mixed at a volume ratio of 3:7. $LiPF_6$ was added to this mixed solvent such that the concentration of $LiPF_6$ was 1.0 mol/L. Thus, a non-aqueous electrolytic solution was prepared.

[Manufacture of Non-Aqueous Electrolyte Secondary Battery]

In an inert atmosphere, the negative electrode and a lithium metal foil each having a Ni tab were oppositely disposed with a polyethylene separator interposed therebetween to prepare an electrode assembly. The electrode assembly was placed in a battery housing formed of an aluminum laminated film. The non-aqueous electrolytic solution was poured into the battery housing, and the battery housing was sealed. Thus, a battery A1 was manufactured.

The batteries of Example 1 and the examples and the comparative examples described later were examined by the following method. Tables 1 and 2 show the evaluation results together with the analysis results of the negative-electrode active materials.

[Measurement of Charge Capacity Ratio]

Charging

Constant-current charging at an electric current of 0.2 It to a voltage of 0 V was followed by constant-current charging at an electric current of 0.05 It to a voltage of 0 V.

The ratio (charge capacity ratio) of the charge capacity of each battery to the charge capacity of a battery B1 of Comparative Example 1, which was taken as 100, was determined.

Charge capacity ratio (%)=(charge capacity of each battery/charge capacity of battery $B1$)×100

[Measurement of Capacity Retention Ratio (Cycle Characteristics Evaluation)]

Charging

Constant-current charging at an electric current of 0.2 It to a voltage of 0 V was followed by constant-current charging at an electric current of 0.05 It to a voltage of 0 V.

Discharging

Constant-current discharging was performed at an electric current of 0.2 It to a voltage of 1.0 V.

Rest

The rest period between the charging and discharging was 10 minutes.

The ratio (capacity retention ratio) of the capacity retention rate of each battery after 20 cycles to the capacity retention rate of the battery B1 after 20 cycles, which was taken as 100, was determined.

Capacity retention ratio (%)=(capacity retention rate of each battery after 20 cycles/capacity retention rate of battery $B1$ after 20 cycles)×100

[Evaluation of Initial Charge/Discharge Efficiency]

The ratio of discharge capacity to charge capacity in the first cycle in the cycle characteristics evaluation was considered to be initial charge/discharge efficiency.

Initial charge/discharge efficiency (%)=discharge capacity in first cycle/charge capacity in first cycle×100

[Evaluation of Appearance of Negative-Electrode Active Material Particles (Check for Particle Disintegration)]

After one cycle of charging and discharging (the charge/discharge conditions were the same as in the cycle characteristics evaluation), the battery was disassembled in an inert atmosphere. A negative electrode was removed from the disassembled battery. A cross section of the negative-electrode active material was exposed in an inert atmosphere with a cross-section polisher (manufactured by JEOL Ltd.) and was observed with a SEM to check for particle disintegration. Particle disintegration means that one particle in the cross section is broken into two or more fine particles.

Example 2

A negative-electrode active material and a battery A2 were manufactured in the same manner as in Example 1 except that the heat-treatment time was 800° C.

Example 3

A negative-electrode active material and a battery A3 were manufactured in the same manner as in Example 1 except that the grinding time after the addition of the Li$_2$SiO$_3$ powder was 20 hours.

Example 4

A negative-electrode active material and a battery A4 were manufactured in the same manner as in Example 1 except that the grinding time after the addition of the Li$_2$SiO$_3$ powder was 10 hours.

Example 5

A negative-electrode active material and a battery A5 were manufactured in the same manner as in Example 1 except that a Li$_2$Si$_2$O$_5$ powder was added instead of the Li$_2$SiO$_3$ powder.

Comparative Example 1

A negative-electrode active material and a battery B1 were manufactured in the same manner as in Example 1 except that no Fe powder was added.

Comparative Example 2

A negative-electrode active material and a battery B2 were manufactured in the same manner as in Example 1 except that the heat-treatment temperature was 500° C.

Comparative Example 3

A negative-electrode active material and a battery B3 were manufactured in the same manner as in Example 1 except that the heat-treatment temperature was 850° C.

Comparative Example 4

A negative-electrode active material and a battery B4 were manufactured in the same manner as in Comparative Example 1 except that the heat-treatment time was 1000° C.

Example 6

A negative-electrode active material and a battery A6 were manufactured in the same manner as in Example 1 except that the amount of added Fe powder was 5% by mass (55% by mass Li$_2$SiO$_3$).

Example 7

A negative-electrode active material and a battery A7 were manufactured in the same manner as in Example 1 except that the amount of added Fe powder was 6% by mass (54% by mass Li$_2$SiO$_3$)

Example 8

A negative-electrode active material and a battery A8 were manufactured in the same manner as in Example 1 except that the amount of added Fe powder was 0.5% by mass (59.5% by mass Li$_2$SiO$_3$).

Example 9

A negative-electrode active material and a battery A9 were manufactured in the same manner as in Example 1 except that the amount of added Fe powder was 0.02% by mass (59.98% by mass Li$_2$SiO$_3$)

TABLE 2

|  | A6 | A7 | A8 | A9 |
| --- | --- | --- | --- | --- |
| Heat-treatment temperature | 600° C. | 600° C. | 600° C. | 600° C. |

TABLE 1

|  | A1 | A2 | A3 | A4 | A5 | B1 | B2 | B3 | B4 |
| --- | --- | --- | --- | --- | --- | --- | --- | --- | --- |
| Heat-treatment temperature | 600° C. | 800° C. | 600° C. | 600° C. | 600° C. | 600° C. | 500° C. | 850° C. | 1000° C. |
| Fe content | 3 mass % | 3 mass % | 3 mass % | 3 mass % | 3 mass % | — | 3 mass % | 3 mass % | — |
| FeSi half-width | 0.546 | 0.484 | 0.521 | 0.492 | 0.548 | — | No peak | 0.354 | — |
| Si half-width | 0.480 | 0.420 | 0.452 | 0.431 | 0.521 | 0.395 | 0.610 | 0.280 | 0.098 |
| Li silicate | Li$_2$SiO$_3$ | Li$_2$SiO$_3$ | Li$_2$SiO$_3$ | Li$_2$SiO$_3$ | Li$_2$Si$_2$O$_5$ | Li$_2$SiO$_3$ | Li$_2$SiO$_3$ | Li$_2$SiO$_3$ | Li$_2$SiO$_3$ |
| Li silicate half-width | 0.233 | 0.105 | 0.093 | 0.051 | 0.102 | 0.213 | 0.319 | 0.066 | 0.038 |
| Charge capacity ratio | 112 | 105 | 108 | 106 | 114 | 100 | 107 | 94 | 95 |
| Capacity retention ratio | 145 | 125 | 131 | 121 | 151 | 100 | 25 | 85 | 50 |
| Initial charge/discharge efficiency | 80% | 78% | 73% | 65% | 75% | 72% | 64% | 76% | 60% |
| Particle disintegration | None | None | None | None | None | None | Observed | None | None |

Table 1 shows that the batteries A1 to A5 of the examples had a capacity retention ratio of 121% or more and had better cycle characteristics than the batteries B1 to B4 of the comparative examples. The batteries A1 to A5 had no disintegration of negative-electrode active material particles due to charging and discharging and had high charge capacity and initial charge/discharge efficiency. More specifically, when a diffraction peak of an FeSi alloy at 2θ=approximately 45 degrees in an XRD pattern of a negative-electrode active material has a half-width of 0.40 degrees or more, and a diffraction peak of the Si (111) plane at 2θ=approximately 28 degrees in the XRD pattern has a half-width of 0.40 degrees or more, the negative-electrode active material can be used to constitute a non-aqueous electrolyte secondary battery having high charge capacity and initial charge/discharge efficiency and good cycle characteristics.

TABLE 2-continued

|  | A6 | A7 | A8 | A9 |
| --- | --- | --- | --- | --- |
| Fe content | 5 mass % | 6 mass % | 0.5 mass % | 0.02 mass % |
| FeSi half-width | 0.524 | 0.504 | 0.557 | 0.604 |
| Si half-width | 0.466 | 0.456 | 0.480 | 0.451 |
| Li silicate | Li$_2$SiO$_3$ | Li$_2$SiO$_3$ | Li$_2$SiO$_3$ | Li$_2$SiO$_3$ |
| Li silicate half-width | 0.231 | 0.225 | 0.244 | 0.235 |
| Charge capacity ratio | 100 | 96 | 106 | 102 |

TABLE 2-continued

|  | A6 | A7 | A8 | A9 |
|---|---|---|---|---|
| Capacity retention ratio | 125 | 112 | 135 | 108 |
| Initial charge/discharge efficiency | 76% | 78% | 75% | 73% |
| Particle disintegration | None | None | None | None |

Table 2 shows that the batteries A6 to A9 of the examples (Fe content: 0.02% to 6% by mass) also had high charge capacity and initial charge/discharge efficiency and good cycle characteristics. In particular, excellent characteristics were obtained at an Fe content in the range of 0.5% to 5% by mass.

REFERENCE SIGNS LIST negative-electrode active material particle, 11 lithium silicate phase, 12 particle, 13 base particle, 14 electrically conductive layer, 15 core particle, 16 surface layer

The invention claimed is:

1. A negative-electrode active material for a non-aqueous electrolyte secondary battery, comprising:
   a lithium silicate phase represented by $Li_{2z}SiO_{(2+z)}$ $\{0<z<2\}$; and
   particles dispersed in the lithium silicate phase, the particles containing a silicon (Si) core particle and a surface layer formed of an iron alloy containing Si (FeSi alloy),
   wherein in an XRD pattern obtained by XRD measurement, a diffraction peak of the FeSi alloy at 2θ=approximately 45 degrees has a half-width of 0.40 degrees or more, and a diffraction peak of a Si (111) plane at 2θ=approximately 28 degrees has a half-width of 0.40 degrees or more.

2. The negative-electrode active material for a non-aqueous electrolyte secondary battery according to claim 1, wherein a diffraction peak of a (111) plane of a lithium silicate in the XRD pattern has a half-width of 0.05 degrees or more.

3. The negative-electrode active material for a non-aqueous electrolyte secondary battery according to claim 1 wherein the metal particles are composed mainly of Fe.

4. The negative-electrode active material for a non-aqueous electrolyte secondary battery according to claim 1, wherein the metal or alloy constituting the metal particles forms an alloy with at least one of Si and a lithium silicate.

5. The negative-electrode active material for a non-aqueous electrolyte secondary battery according to claim 1, wherein the metal particles constitute 0.01% to 20% by mass of a total mass of a base particle composed of the lithium silicate phase, the silicon particles, and the metal particles.

6. The negative-electrode active material for a non-aqueous electrolyte secondary battery according to claim 1, wherein no $SiO_2$ peak is observed at 2θ=25 degrees in an XRD pattern obtained by XRD measurement.

7. The negative-electrode active material for a non-aqueous electrolyte secondary battery according to claim 1, wherein the metal particles have an average particle size of 100 nm or less.

8. The negative-electrode active material for a non-aqueous electrolyte secondary battery according to claim 1, wherein the silicon particles have an average particle size of 200 nm or less before initial charging.

9. The negative-electrode active material for a non-aqueous electrolyte secondary battery according to claim 1, wherein the lithium silicate phase, the silicon particles, and the metal particles constitute a base particle, and the base particle is covered with an electrically conductive layer.

10. The negative-electrode active material for a non-aqueous electrolyte secondary battery according to claim 1, wherein the lithium silicate phase is composed mainly of $Li_2SiO_3$.

11. The negative-electrode active material for a non-aqueous electrolyte secondary battery according to claim 1, wherein the lithium silicate phase is composed mainly of $Li_2Si_2O_5$.

12. The negative-electrode active material for a non-aqueous electrolyte secondary battery according to claim 1, wherein the negative-electrode active material for a non-aqueous electrolyte secondary battery after charging and discharging contains no $Li_4SiO_4$.

13. A non-aqueous electrolyte secondary battery comprising: a negative electrode containing the negative-electrode active material according to claim 1;
   a positive electrode; and
   a non-aqueous electrolyte.

* * * * *